(12) United States Patent
Abdelghaffar et al.

(10) Patent No.: US 12,255,849 B2
(45) Date of Patent: Mar. 18, 2025

(54) SUBBAND FULL DUPLEX GUARD BAND

(71) Applicant: QUALCOMM Incorporated, San Diego, CA (US)

(72) Inventors: Muhammad Sayed Khairy Abdelghaffar, San Jose, CA (US); Abdelrahman Mohamed Ahmed Mohamed Ibrahim, San Diego, CA (US); Ahmed Attia Abotabl, San Diego, CA (US); Qian Zhang, Basking Ridge, NJ (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 401 days.

(21) Appl. No.: 17/819,264

(22) Filed: Aug. 11, 2022

(65) Prior Publication Data

US 2024/0056264 A1    Feb. 15, 2024

(51) Int. Cl.
*H04L 5/00*  (2006.01)
*H04B 7/06*  (2006.01)
*H04L 5/14*  (2006.01)

(52) U.S. Cl.
CPC ......... *H04L 5/0057* (2013.01); *H04B 7/0626* (2013.01); *H04L 5/14* (2013.01)

(58) Field of Classification Search
CPC .................................................... H04B 7/0626
See application file for complete search history.

(56) References Cited

U.S. PATENT DOCUMENTS

| 2021/0152418 A1* | 5/2021 | Abdelghaffar | H04B 7/0602 |
| 2023/0224880 A1* | 7/2023 | Xiong | H04L 5/0007 |
| | | | 370/329 |

FOREIGN PATENT DOCUMENTS

GB        2619500 A  * 12/2023  ............ H04W 72/04

* cited by examiner

*Primary Examiner* — Michael A Keller
(74) *Attorney, Agent, or Firm* — Harrity & Harrity, LLP

(57) ABSTRACT

Various aspects of the present disclosure generally relate to wireless communication. In some aspects, a user equipment (UE) may transmit a channel state information report in a subband full duplex slot using a first guard band. The UE may receive a physical downlink shared channel (PDSCH) communication. The UE may transmit an indication of an adjustment, based at least in part on the PDSCH communication, to use for a second guard band with respect to the first guard band. Numerous other aspects are described.

30 Claims, 14 Drawing Sheets

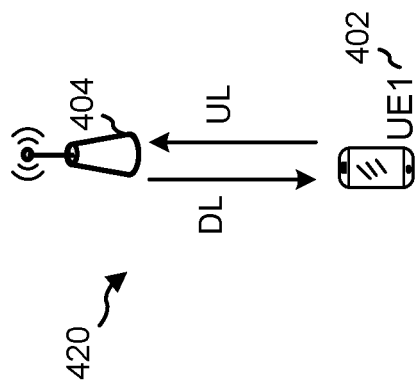
FIG. 4B
FIG. 4C
FIG. 4A

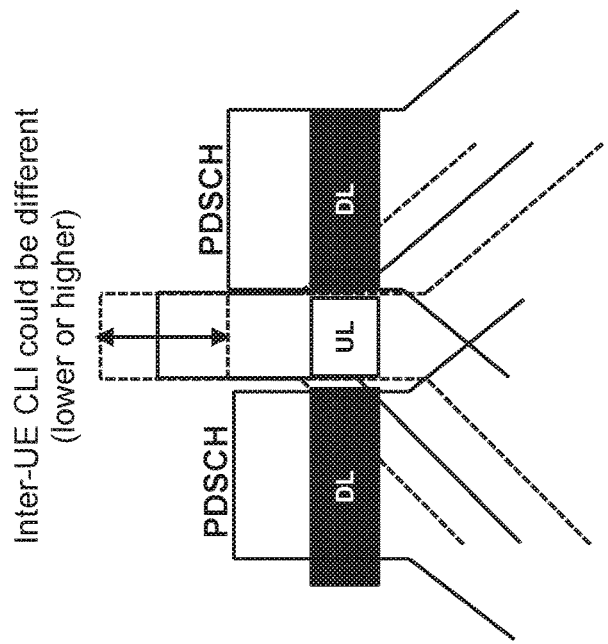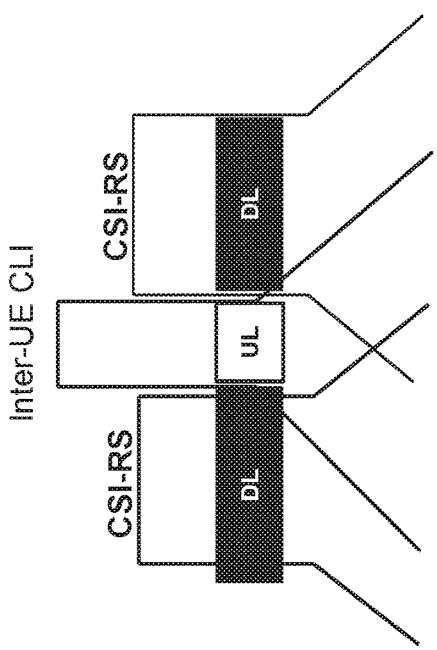
FIG. 7

SUBBAND FULL DUPLEX GUARD BAND

FIELD OF THE DISCLOSURE

Aspects of the present disclosure generally relate to wireless communication and specifically to techniques and apparatuses for indicating a subband full duplex guard band.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include transmitting a channel state information (CSI) report in a subband full duplex (SBFD) slot using a first guard band. The method may include receiving a physical downlink shared channel (PDSCH) communication. The method may include transmitting an indication of an adjustment, based at least in part on the PDSCH communication, to use for a second guard band with respect to the first guard band.

Some aspects described herein relate to a method of wireless communication performed by a network entity. The method may include receiving a CSI report in an SBFD slot that uses a first guard band. The method may include transmitting a PDSCH communication. The method may include receiving an indication of an adjustment for a second guard band with respect to the first guard band. The first guard band may be based at least in part on a UE capability of a minimum guard band for SBFD operation. The first guard band may be based at least in part on an on earlier CSI report of a guard band.

Some aspects described herein relate to a UE for wireless communication. The UE may include a memory and one or more processors coupled to the memory. The one or more processors may be configured to transmit a CSI report in an SBFD slot using a first guard band. The one or more processors may be configured to receive a PDSCH communication. The one or more processors may be configured to transmit an indication of an adjustment, based at least in part on the PDSCH communication, to use for a second guard band with respect to the first guard band.

Some aspects described herein relate to a network entity for wireless communication. The network entity may include a memory and one or more processors coupled to the memory. The one or more processors may be configured to receive a CSI report in an SBFD slot that uses a first guard band. The one or more processors may be configured to transmit a PDSCH communication. The one or more processors may be configured to receive an indication of an adjustment for a second guard band with respect to the first guard band.

Some aspects described herein relate to a non-transitory computer-readable medium that stores a set of instructions for wireless communication by a UE. The set of instructions, when executed by one or more processors of the UE, may cause the UE to transmit a CSI report in an SBFD slot using a first guard band. The set of instructions, when executed by one or more processors of the UE, may cause the UE to receive a PDSCH communication. The set of instructions, when executed by one or more processors of the UE, may cause the UE to transmit an indication of an adjustment, based at least in part on the PDSCH communication, to use for a second guard band with respect to the first guard band.

Some aspects described herein relate to a non-transitory computer-readable medium that stores a set of instructions for wireless communication by a network entity. The set of instructions, when executed by one or more processors of the network entity, may cause the network entity to receive a CSI report in an SBFD slot that uses a first guard band. The set of instructions, when executed by one or more processors of the network entity, may cause the network entity to transmit a PDSCH communication. The set of instructions, when executed by one or more processors of the network entity, may cause the network entity to receive an indication of an adjustment for a second guard band with respect to the first guard band.

Some aspects described herein relate to an apparatus for wireless communication. The apparatus may include means for transmitting a CSI report in an SBFD slot using a first guard band. The apparatus may include means for receiving a PDSCH communication. The apparatus may include means for transmitting an indication of an adjustment, based at least in part on the PDSCH communication, to use for a second guard band with respect to the first guard band.

Some aspects described herein relate to an apparatus for wireless communication. The apparatus may include means for receiving a CSI report in an SBFD slot that uses a first guard band. The apparatus may include means for transmitting a PDSCH communication. The apparatus may include means for receiving an indication of an adjustment for a second guard band with respect to the first guard band.

Aspects generally include a method, apparatus, system, computer program product, non-transitory computer-readable medium, UE, base station, network entity, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

FIGS. 4A-4C are diagrams illustrating examples of full-duplex (FD) communication in accordance with the present disclosure.

FIG. 7 is a diagram illustrating an example of cross-link interference differences, in accordance with the present disclosure.

DETAILED DESCRIPTION

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Figure 1:
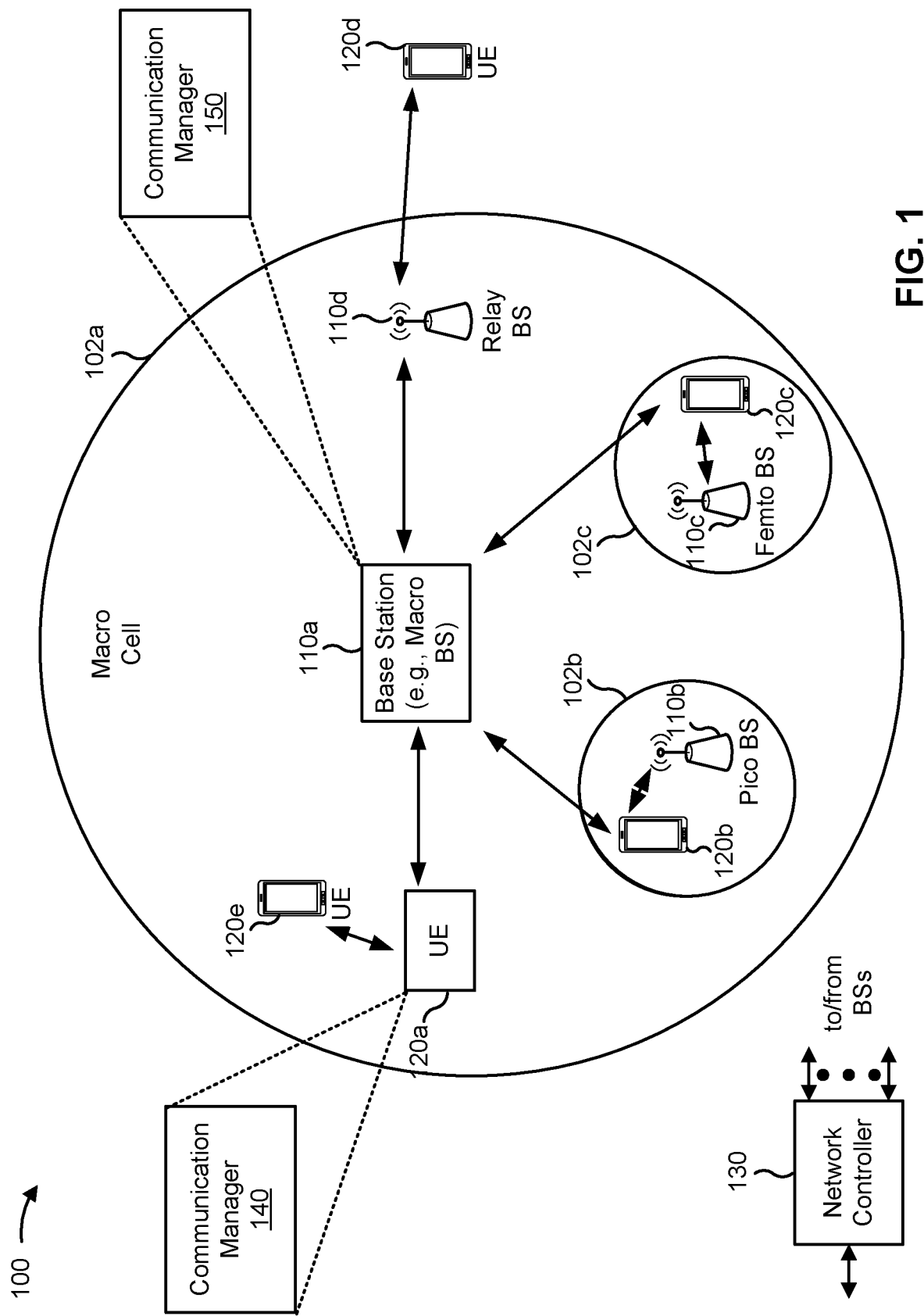
FIG. 1 is a diagram illustrating an example of a wireless network in accordance with the present disclosure.

FIG. 1 is a diagram illustrating an example of a wireless network in accordance with the present disclosure. The wireless network 100 may be or may include elements of a 5G (e.g., NR) network or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, or a transmission reception point (TRP). Each base station 110 may provide communication coverage for a particular geographic area. In the Third Generation Partnership Project (3GPP), the term "cell" can refer to a coverage area of a base station 110 or a base station subsystem serving this coverage area, depending on the context in which the term is used.

A base station 110 may provide communication coverage for a macro cell, a pico cell, a femto cell, or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station.

The wireless network 100 may be a heterogeneous network that includes base stations 110 of different types, such as macro base stations, pico base stations, femto base stations, or relay base stations. These different types of base stations 110 may have different transmit power levels, different coverage areas, or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts). In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells. A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

In some aspects, the term "base station" (e.g., the base station 110) or "network entity" may refer to an aggregated base station, a disaggregated base station, an integrated access and backhaul (IAB) node, a relay node, or one or more components thereof. For example, in some aspects, "base station" or "network entity" may refer to a central unit (CU), a distributed unit (DU), a radio unit (RU), a Near-Real Time (Near-RT) RAN Intelligent Controller (MC), or a Non-Real Time (Non-RT) MC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some examples, a cell may not necessarily be stationary, and the geographic area of the cell may move in accordance with the location of a base station 110 that is mobile (e.g., a mobile base station). In some examples, the base stations 110 may be interconnected to one another or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, or a satellite radio), a vehicular component or sensor, a smart meter/sensor, industrial manufacturing equipment, a global positioning system device, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a base station, another device (e.g., a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (e.g., one or more processors) and the memory components (e.g., a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the base station 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz," if used herein, may broadly represent frequencies that may be less than 6 GHz, may be within FR1, or may include mid-band frequencies. Further, unless specifically stated otherwise, it should be understood that the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (e.g., FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may transmit a CSI report in a subband full duplex (SBFD) slot using a first guard band. The communication manager 140 may receive a PDSCH communication and transmit an indication of an adjustment, based at least in part on the PDSCH communication, to use for a second guard band with respect to the first guard band. Additionally, or alternatively, the communication manager 140 may perform one or more other operations described herein.

In some aspects, a network entity (e.g., base station 110) may include a communication manager 150. As described in more detail elsewhere herein, the communication manager 150 may receive a CSI report in an SBFD slot that uses a first guard band. The communication manager 150 may transmit a PDSCH communication, and receive an indication of an adjustment for a second guard band with respect to the first guard band. Additionally, or alternatively, the communication manager 150 may perform one or more other operations described herein.

As indicated above, FIG. 1 is provided as an example. Other examples may differ from what is described with regard to FIG. 1.

Figure 2:
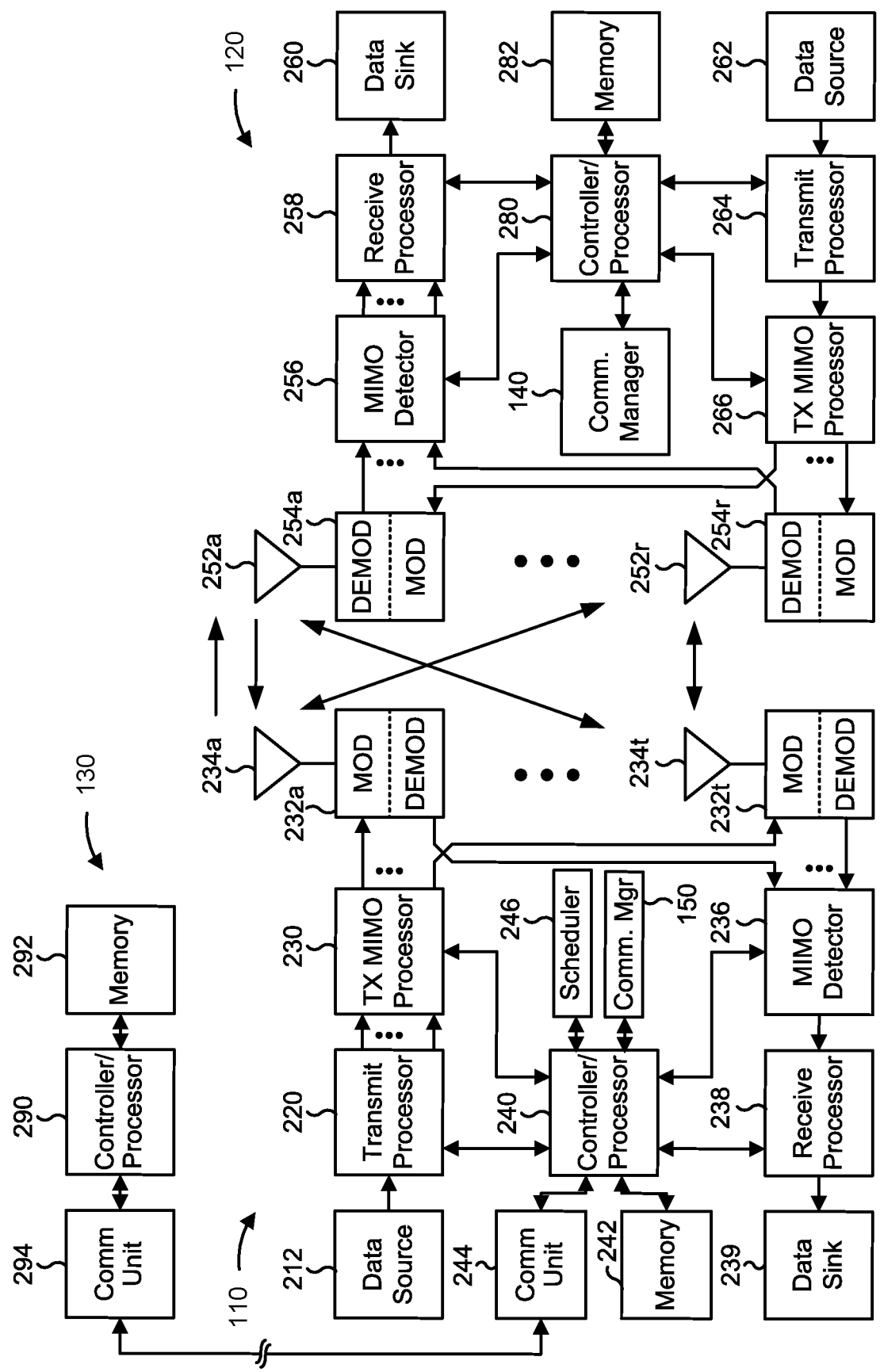
FIG. 2 is a diagram illustrating an example base station in communication with a user equipment (UE) in a wireless network in accordance with the present disclosure.

FIG. 2 is a diagram illustrating an example base station 110 in communication with a UE 120 in a wireless network in accordance with the present disclosure. The base station 110 may correspond to the base station 110 of FIG. 1. Similarly, the UE 120 may correspond to the UE 120 of FIG. 1. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (e.g., for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (e.g., the controller/processor 280) and the memory 282 to perform aspects of any of the methods described herein.

At the base station 110, the uplink signals from UE 120 or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (e.g., the controller/processor 240) and the memory 242 to perform aspects of any of the methods described herein.

The controller/processor of a network entity (e.g., controller/processor 240 of the base station 110), the controller/processor 280 of the UE 120, or any other component(s) of FIG. 2 may perform one or more techniques associated with indicating a guard band for SBFD, as described in more detail elsewhere herein. For example, the controller/processor 240 of the base station 110, the controller/processor 280 of the UE 120, or any other component(s) of FIG. 2 may perform or direct operations of, for example, process 1100 of FIG. 11, process 1200 of FIG. 12, or other processes as described herein. The memory 242 and the memory 282 may store data and program codes for the base station 110 and the UE 120, respectively. In some examples, the memory 242 or the memory 282 may include a non-transitory computer-readable medium storing one or more instructions (e.g., code or program code) for wireless communication. For example, the one or more instructions, when executed (e.g., directly, or after compiling, converting, or interpreting) by one or more processors of the base station 110 or the UE 120, may cause the one or more processors, the UE 120, or the base station 110 to perform or direct operations of, for example, process 1100 of FIG. 11, process 1200 of FIG. 12, or other processes as described herein. In some examples, executing instructions may include running the instructions, converting the instructions, compiling the instructions, or interpreting the instructions, among other examples.

In some aspects, the UE 120 includes means for transmitting a CSI report in an SBFD slot using a first guard band; means for receiving a PDSCH communication; and/or means for transmitting an indication of an adjustment, based at least in part on the PDSCH communication, to use for a second guard band with respect to the first guard band. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity (e.g., base station 110) includes means for receiving a CSI report in a subband full duplex slot that uses a first guard band; means for transmitting a PDSCH communication; and/or means for receiving an indication of an adjustment for a second guard band with respect to the first guard band. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station.

An aggregated base station may be configured to utilize a radio protocol stack that is physically or logically integrated within a single RAN node (e.g., within a single device or unit). A disaggregated base station may be configured to utilize a protocol stack that is physically or logically distributed among two or more units (such as a CU, one or more DUs, or one or more RUs). In some examples, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

As indicated above, FIG. 2 is provided as an example. Other examples may differ from what is described with regard to FIG. 2.

Figure 3:
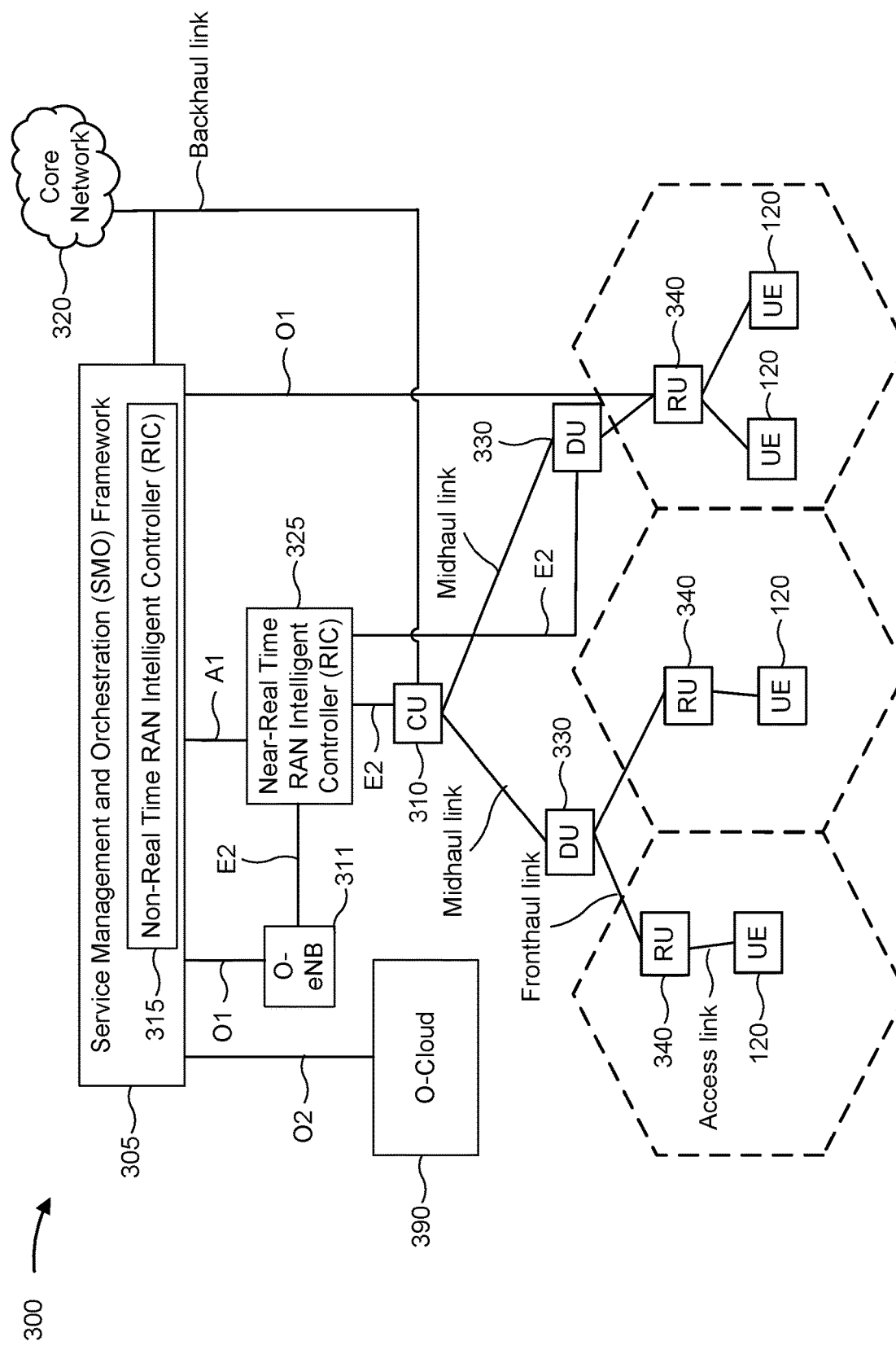
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (e.g., Central Unit-User Plane (CU-UP) functionality), control plane functionality (e.g., Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which may also be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based at least in part on a functional split (e.g., a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT MC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT MC 315 or the Near-RT MC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

FIGS. 4A-4C are diagrams illustrating examples of full-duplex (FD) communication in accordance with the present disclosure. A first full-duplex scenario 400 depicted in FIG. 4A includes a UE1 402 and two base stations (e.g., network entities or TRPs) 404-1, 404-2, where the UE1 402 is sending uplink transmissions to base station 404-1 and is receiving downlink transmissions from base station 404-2. In the first full-duplex scenario 400 of FIG. 4A, FD is enabled for the UE1 402, but not for the base stations 404-1, 404-2. A second full-duplex scenario 410 depicted in FIG. 4B includes two UEs, shown as UE1 402-1 and UE2 402-2, and a base station 404, where the UE1 402-1 is receiving a downlink transmission from the base station 404 and the UE2 402-2 is transmitting an uplink transmission to the base station 404. In the second full-duplex scenario 410, FD is enabled for the base station 404, but not for UE1 402-1 and UE2 402-2. A third full-duplex scenario 420 is depicted in FIG. 4C that includes a UE1 402 and a base station 404, where the UE1 402 is receiving a downlink transmission from the base station 404 and the UE1 402 is transmitting an uplink transmission to the base station 404. In the third full-duplex scenario 420, FD is enabled for both the UE1 402 and the base station 404.

As indicated above, FIGS. 4A-4C provide some examples. Other examples may differ from what is described with regard to FIGS. 4A-4C.

Figure 5:
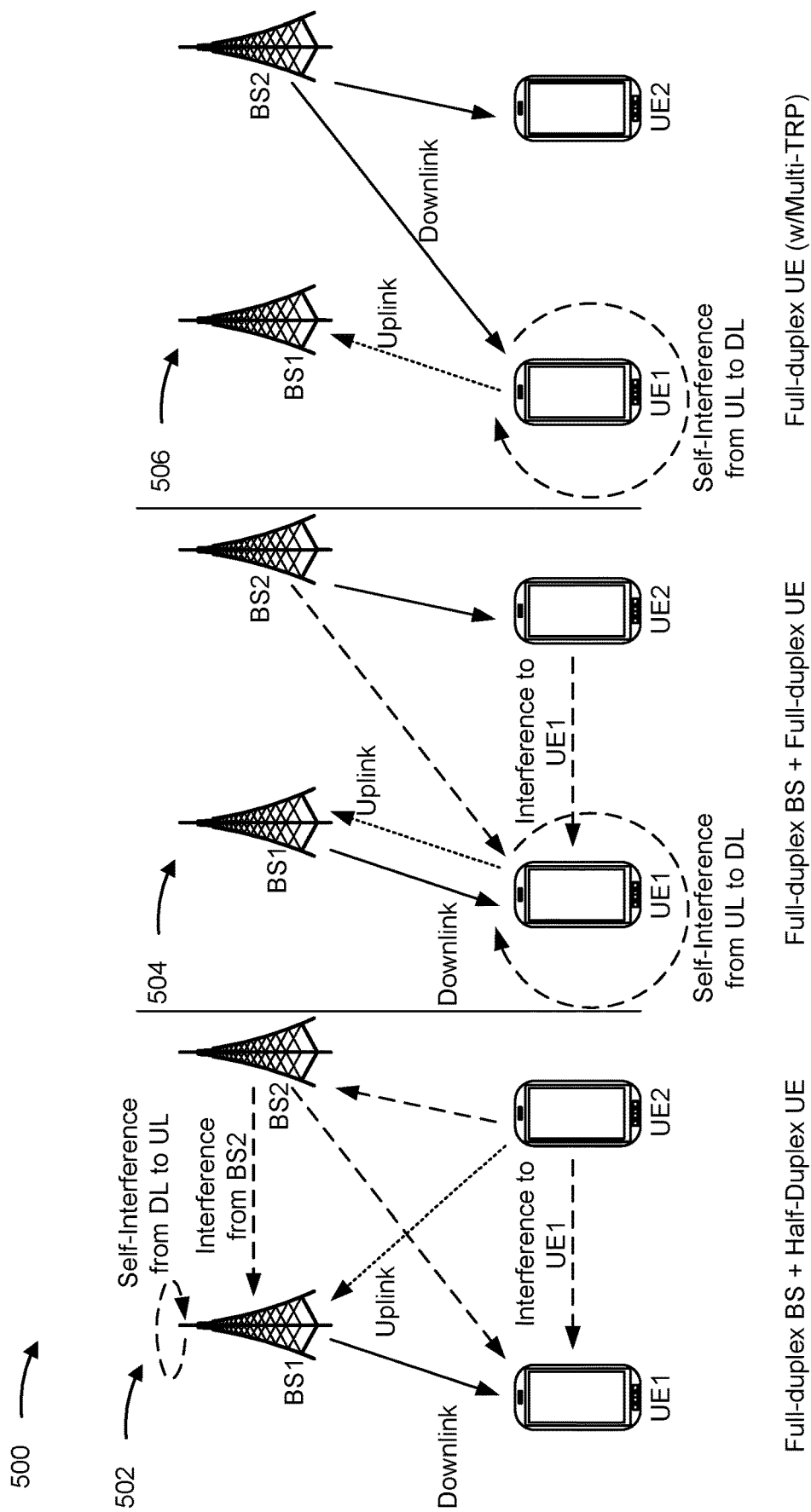
FIG. 5 is a diagram illustrating an example of full-duplex communication modes, in accordance with the present disclosure.

FIG. 5 is a diagram illustrating an example of full-duplex communication modes 500, in accordance with the present disclosure. In a first mode 502, a first network entity (shown as BS1) and a second network entity (shown as BS2) may be full-duplex devices (e.g., may be capable of communicating in a full-duplex manner). A first UE and a second UE may be half duplex UEs (e.g., may not be capable of communicating in a full-duplex manner). The first network entity may perform downlink transmissions to the first UE, and the first network entity may receive uplink transmissions from the second UE. The first network entity may experience self-interference (SI) from a downlink to an uplink based at least in part on the downlink transmissions to the first UE and the uplink transmissions received from the second UE. The first network entity may experience interference from the second network entity. The first UE may experience cross-link interference (CLI) from the second network entity and the second UE.

In a second mode 504, a first network entity and a second network entity may be full-duplex devices. A first UE and a second UE may be full-duplex UEs. The first network entity may perform downlink transmissions to the first UE, and the first network entity may receive uplink transmissions from the first UE. The first UE may experience SI from an uplink to a downlink based at least in part on the downlink transmissions from the first network entity and the uplink transmissions to the first network entity. The first UE may experience CLI from the second network entity and the second UE.

In a third mode 506, a first UE and a second UE may be full-duplex UEs and may communicate in a multi-TRP configuration. A first network entity may receive uplink transmissions from the first UE, and a second network entity may perform downlink transmissions to the first UE and the second UE. The first UE may experience SI from an uplink to a downlink based at least in part on the uplink transmissions to the first network entity and the downlink transmissions from the second network entity.

As indicated above, FIG. 5 is provided as an example. Other examples may differ from what is described with regard to FIG. 5.

Figure 6:
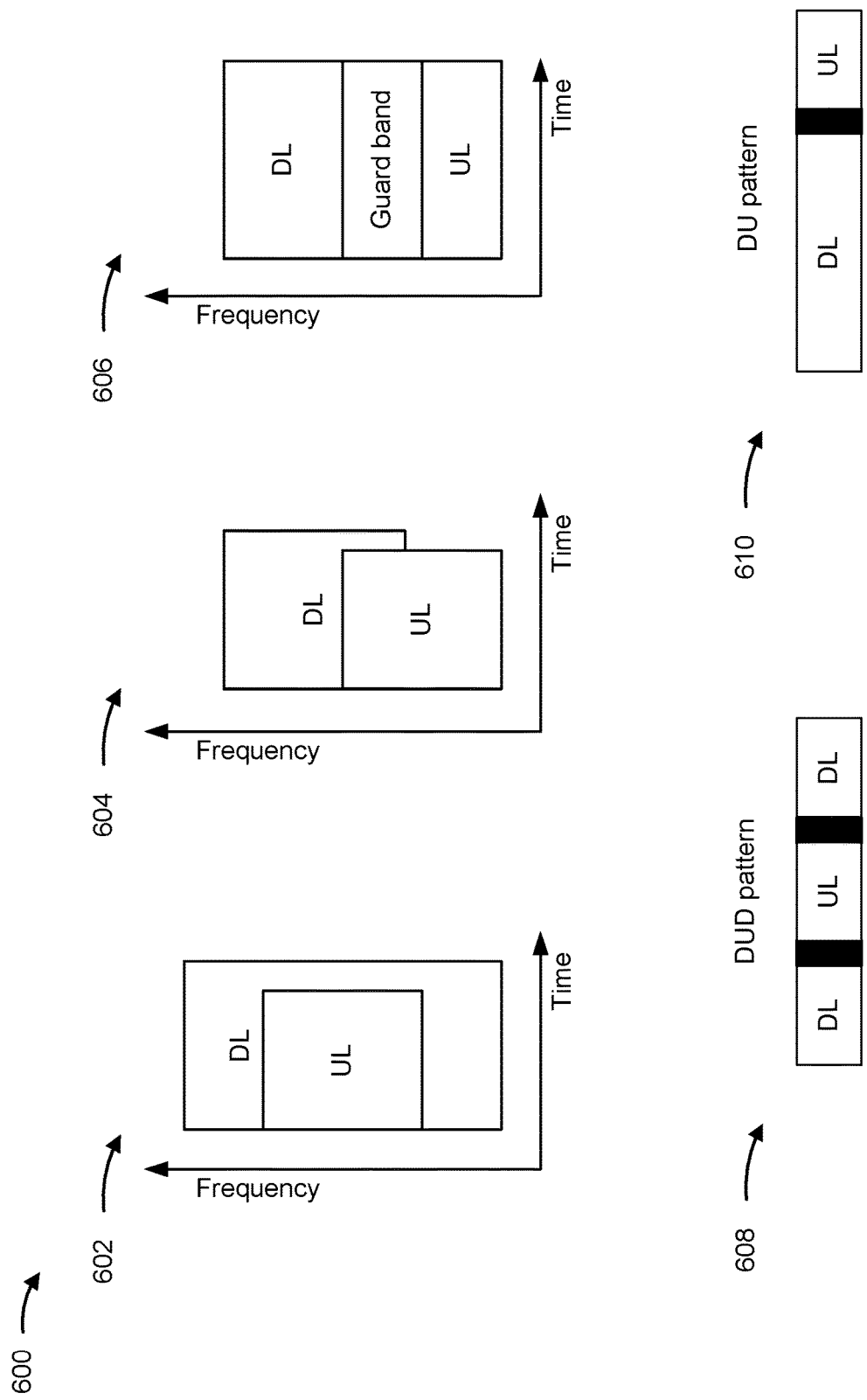
FIG. 6 is a diagram illustrating examples of full-duplex communication, in accordance with the present disclosure.

FIG. 6 is a diagram illustrating examples of full-duplex communication 600, in accordance with the present disclosure. In some cases, a wireless communication device (such as a UE or a network entity) may support full-duplex operations. Full-duplex operations may include the wireless communication device transmitting and receiving at approximately the same time.

A UE may operate in an in-band full-duplex mode. In the in-band full-duplex mode, the UE may transmit and receive on a same time and frequency resource. An uplink and a downlink may share the same time and frequency resource. For example, in a first full-duplex communication 602, a time and frequency resource for the uplink may fully overlap with a time and frequency resource for the downlink. As another example, in a second full-duplex communication 604, a time and frequency resource for the uplink may partially overlap with a time and frequency resource for the downlink.

Full-duplex operations may include an SBFD mode. The SBFD mode may also be referred to as a subband frequency division duplex mode or a flexible duplex mode. SBFD communication 606 shows that the wireless communication device may transmit and receive at a same time (in the same SBFD slot), but the wireless communication device may transmit and receive on different frequency domain resources. For example, a network entity may be operating in an SBFD mode. The network entity may schedule a first UE to receive a downlink communication in an SBFD slot. The network entity may schedule a second UE to transmit an uplink communication in the same SBFD slot. However, the uplink communication may cause interference for the first UE that is receiving the downlink communication. To address this, a downlink time/frequency resource in the SBFD slot may be separated (e.g., in time or frequency) from an uplink time/frequency resource in the SBFD slot by a gap, which may function to reduce self-interference and improve latency and uplink coverage. The gap may be a frequency offset or a frequency gap (guard band) between downlink time/frequency resources and uplink time/frequency resources in the same SBFD slot.

In some cases, a network entity may configure a UE with an SBFD subband configuration to provide enhanced uplink coverage, reduced latency, improved system capacity, and improved configuration flexibility for NR time division duplexing operations in unpaired spectrum. Example 600 shows an SBFD subband configuration 608 for an SBFD slot. SBFD subband configuration 608 may be considered a DUD pattern, where the subband in the SBFD slot includes an uplink (UL) subband (at the center of the channel bandwidth) between two downlink (DL) subbands (at two sides of the channel bandwidth).

Example 600 also shows an SBFD subband configuration 610 for an SBFD slot. SBFD subband configuration 610 may be considered a DU pattern, where the subband in the SBFD slot includes an uplink subband at one side of the channel bandwidth and a downlink subband at the other side of the channel bandwidth.

In some cases, parameters for an SBFD subband configuration may include the quantity (ND) of resource blocks (RBs) in one downlink subband, the quantity (Nu) of RBs in one uplink subband, and/or the quantity (NG) of RBs in one guard band between one uplink subband and one downlink subband. SBFD subband configurations may also be subject to minimum or maximum subband sizes, guard band sizes, and/or subband locations within a time division duplexing (TDD) carrier. The time and frequency locations of subbands within the carrier may not be fixed.

The guard band between the uplink and downlink subbands could be UE-specific (i.e., different from the guard band between the uplink and downlink subbands at the network entity). At the network entity, a guard band may be expected or required to reduce the amount of SI at the network entity. In some scenarios, the guard band could be as small as zero guard band (e.g., synchronized uplink and downlink, lower SI). At the UE, a different guard band may be needed to overcome the inter-UE CLI. The actual size of the guard band could be dynamic based on the strength of the downlink signal and the amount of CLI jamming.

As indicated above, FIG. 6 is provided as an example. Other examples may differ from what is described with regard to FIG. 6.

FIG. 7 is a diagram illustrating an example 700 of CLI differences, in accordance with the present disclosure.

In some aspects, a UE may report (e.g., as part of a CSI report or as part of UE capability or UE assistance information) the required guard band (minimum guard band) between a downlink signal and uplink interference. However, as shown by example 700, the amount of the inter-UE CLI observed during PDSCH reception could be different than the CLI observed during a CSI report. This may lead to use of a guard band size that is ineffective and/or inefficient.

As indicated above, FIG. 7 is provided as an example. Other examples may differ from what is described with regard to FIG. 7.

Figure 8:
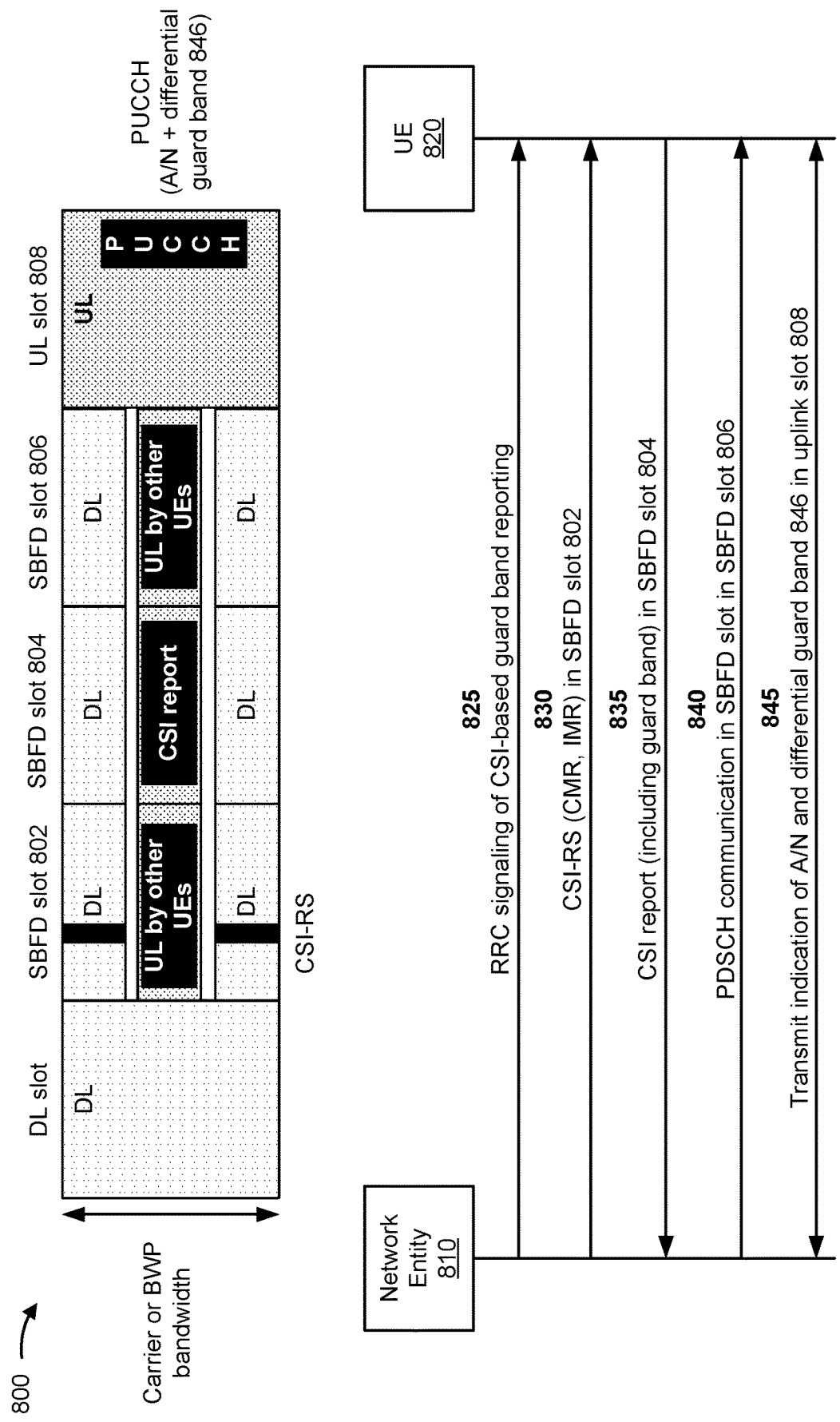
FIG. 8 is a diagram illustrating an example of indicating a differential guard band, in accordance with the present disclosure.

FIG. 8 is a diagram illustrating an example 800 of indicating a differential guard band, in accordance with the present disclosure. Example 800 shows a network entity 810 (e.g., base station 110) and a UE 820 (e.g., UE 120) that may communicate with each other via a wireless network (e.g., wireless network 100).

According to various aspects described herein, the UE 820 may indicate, as part of PDSCH decoding, a differential guard band (e.g., delta increase or decrease of NRBs for the guard band). The differential guard band may be based at least in part on the observed CLI during PDSCH decoding or signal-to-interference-plus-noise ratio (SINR) processing of the PDSCH or a DMRS. The differential guard band may be included with feedback, such as a hybrid automatic repeat request (HARD) acknowledgment (ACK) or a negative acknowledgment (NACK), shown as A/N.

The network entity 810 may receive the indication of the differential guard band. The network entity 810 may adjust a guard band size by increasing or decreasing a guard band size based at least in part on the differential guard band. This may include increasing or decreasing a previously used guard band size by the amount of the differential guard band or a modification of the amount. The network entity 810 may also not use the differential guard band based at least in part on information about traffic or conditions not available to the UE 820. In some aspects, the network entity 810 may determine the guard band for the UE 820 based at least in part on a comparison of the guard band indicated in the CSI report and the differential guard band indicated with feedback. By providing a differential guard band, the network entity 810 may configure a more effective and/or more efficient guard band while conserving signaling resources. A more effective guard band may reduce interference and improve communications without a significant reduction in throughput or a significant increase in latency.

Example 800 shows multiple slots of a slot pattern for a carrier or bandwidth part (BWP) bandwidth. The slot pattern includes, among other slots, an SBFD slot 802 in which a CSI reference signal (CSI-RS) is received by the UE 820 and an SBFD slot 804 in which the UE 820 transmits a CSI report. The CSI report may include an indication of a guard band. The slot pattern also includes an SBFD slot 806 for downlink subbands and for other UEs to use the uplink subband. The slot pattern also includes an uplink slot 808 in which the UE 820 may transmit uplink control information or other information in a physical uplink control channel (PUCCH) communication.

As shown by reference number 825, the network entity 810 may transmit RRC signaling that configures the UE 820 for CSI-based guard band reporting. As shown by reference number 830, the network entity 810 may transmit a CSI-RS in SBFD slot 802. The CSI-RS may include a channel measurement resource (CMR) for measuring the signal strength on the channel and an interference measurement resource (IMR) for measuring interference on the channel. As shown by reference number 835, the UE 820 may transmit a CSI report. The CSI report may include an indication of the guard band that is to be used. As shown by reference number 840, the network entity 810 may transmit a physical downlink shared channel (PDSCH) communication. As shown by reference number 845, the UE 820 may transmit an indication of A/N feedback in uplink slot 808. In some aspects, the UE 820 may transmit, in uplink slot 808, an indication of a differential guard band 846. The differential guard band 846 may be multiplexed with the A/N feedback.

As indicated above, FIG. 8 is provided as an example. Other examples may differ from what is described with regard to FIG. 8.

Figure 9:
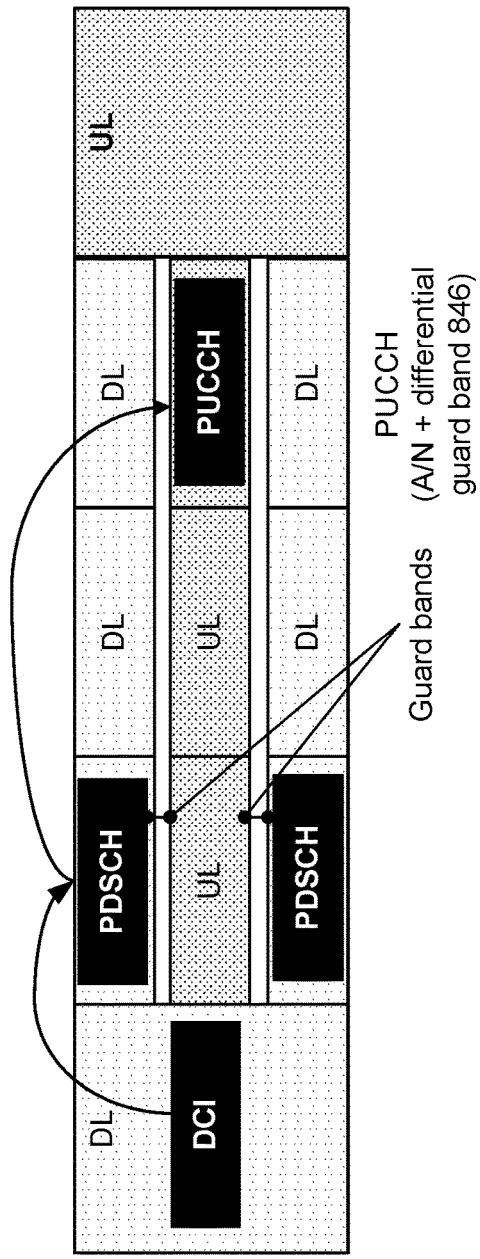
FIG. 9 is a diagram illustrating an example of bundling feedback and a differential guard band, in accordance with the present disclosure.

FIG. 9 is a diagram illustrating an example 900 of bundling feedback and a differential guard band, in accordance with the present disclosure.

In some aspects, the UE 820 may bundle the differential guard band with A/N feedback for faster adaptation of the PDSCH resources within the downlink subbands in SBFD slots. This may guarantee accurate downlink adaptation with regard to the dynamic CLI. Example 900 shows downlink control information (DCI) that schedules PDSCH communications. Example 900 also shows a differential guard band 846 that is based at least in part on measurements on the PDSCH communications. The differential guard band 846 may be bundled with feedback in a PUCCH communication.

In some aspects, the feedback and the differential guard band 846 may be bundled as separate bits. For example, for a bundle of 2 bits, one bit may be for an ACK or NACK and the other bit may be an indication of an increase or decrease of a size of the guard band with respect to a size of the guard band currently used for PDSCH communications. In an example, "00" may indicate a NACK with an increase of the guard band, "01" may indicate a NACK with a decrease of the guard band, "10" may indicate an ACK with an increase of the guard band, and "11" may indicate an ACK with a decrease of the guard band.

Note that if the UE 820 decodes the PDSCH with the current guard band, the UE 820 may decode with a lower or decreased guard band. Accordingly, there may be no need to have feedback of an ACK and an indication of a decreased guard band. If the UE 820 fails to decode the PDSCH with the current guard band, then the UE 820 may fail to decode with a decreased guard band. Accordingly, there may be no need to have feedback of a NACK and a decrease of the guard band. Then, the feedback may be more important when the PDSCH decode fails and the UE 820 requires a larger guard band.

In some aspects, the feedback and the differential guard band 846 may be bits that are jointly encoded. One codepoint ("00") may be used for an ACK. The UE 820 may be able to decode the current transport block or cell block group with the current guard band. The other codepoints may be used for NACK and guard band adjustment. For example, a codepoint of "01" may indicate a NACK and no adjustment of the guard band, a codepoint of "10" may indicate a NACK and an adjustment of the guard band by a first differential amount (e.g., increase), and a codepoint of "11" may indicate a NACK and an adjustment of the guard band by a second differential amount (e.g., increase greater than for codepoint "10").

In some aspects, the feedback and the differential guard band 846 may be jointly encoded where one codepoint ("00") is for an ACK and the other codepoints all indicate adjustments. For example, a codepoint of "01" may indicate a NACK and a first amount of adjustment of the guard band, a codepoint of "10" may indicate a NACK and a second amount of adjustment (e.g., lesser or greater amount), and a codepoint of "11" may indicate a NACK and a third amount of adjustment.

In some aspects, the values of the differential guard band 846 may be RRC configured to the UE 820 and represent an offset with respect to a current guard band of the scheduled PDSCH. The guard band may be measured in terms of RB group (RBG), RBs, and/or resource elements (REs). The guard band may be measured from the edge RBs of the PDSCH communication to the edge RB of the uplink subband. This is the UE-specific guard band that may be larger than the guard band between uplink and downlink subbands.

In some aspects, the UE 820 may indicate two (or more) guard bands, such as one for each downlink subband (assuming an asymmetric guard band). To limit the amount of overhead, the combination of a first differential guard band for a first subband (e.g $\Delta_{GB_{SB1}}$) and a second differential guard band for a second subband (e.g $\Delta_{GB_{SB2}}$) may be RRC configured, where one entry of a configuration (e.g., table) maps to ($\Delta_{GB_{SB1}}$, $\Delta_{GB_{SB2}}$). There may be multiple configurations for the combinations involving the two subbands. The UE 820 may determine a differential guard band based at least in part on a DMRS and/or a PDSCH decoding signal-to-interference ratio (SNR) or SINR.

In some aspects, the UE 820 may transmit an indication of a guard band differential in addition to an updated CQI (e.g., delta CQI), based at least in part on the PDSCH decoding. For example, when a PDSCH communication fails to decode, the UE 820 may transmit an indication of an increase for the guard band with slightly higher MCS. In some aspects, the UE 820 may transmit an indication of the differential guard band with a differential CSI value (e.g., delta CSI). This may be in addition to A/N feedback. This may be applicable when the UE 820 receives a PDSCH communication in full duplex. When the UE 820 receives a PDSCH communication in a TDD slot (e.g., downlink slot), the UE 820 may transmit an indication of the delta CSI in addition to the A/N feedback.

In some aspects, the network entity 810 may transmit a configuration (e.g., PDSCH-config based on UE capability reporting) for the framework described in connection with FIGS. 7-9. In some aspects, the downlink grant scheduling a PDSCH communication may trigger a CSI-RS. In some aspects, the UE 820 may transmit an indication of an observed downlink SNR or SINR (e.g., average across PDSCH communications, per symbol, per subband). In some aspects, a retransmitted PDSCH may have the same PDSCH REs. However, the guard band size to other uplink transmissions may be decreased.

In some aspects, the UE 820 may not observe the CLI across all downlink symbols (e.g., overlap between PDSCH communications and uplink transmissions for other UEs is partial in the time domain). Then, the UE 820 may scale, assuming CLI for every symbol, as the next retransmission may not have the same quantity of SBFD slots. Alternatively, the UE 820 may transmit an indication of a quantity of symbols where CLI is observed.

In some aspects, the network entity 810 may dynamically adapt the indication and configure multiple PUCCH resources. For example, the network entity 810 may configure two PUCCH resources. The PUCCH resource indication field in a downlink grant may be addressed or applied to a first set of PUCCH resources if the feedback is ACK only. The PUCCH resource indication field in the downlink grant may be addressed or applied to a second set of PUCCH resources if the feedback is ACK plus a guard band differential.

As indicated above, FIG. 9 is provided as an example. Other examples may differ from what is described with regard to FIG. 9.

Figure 10:
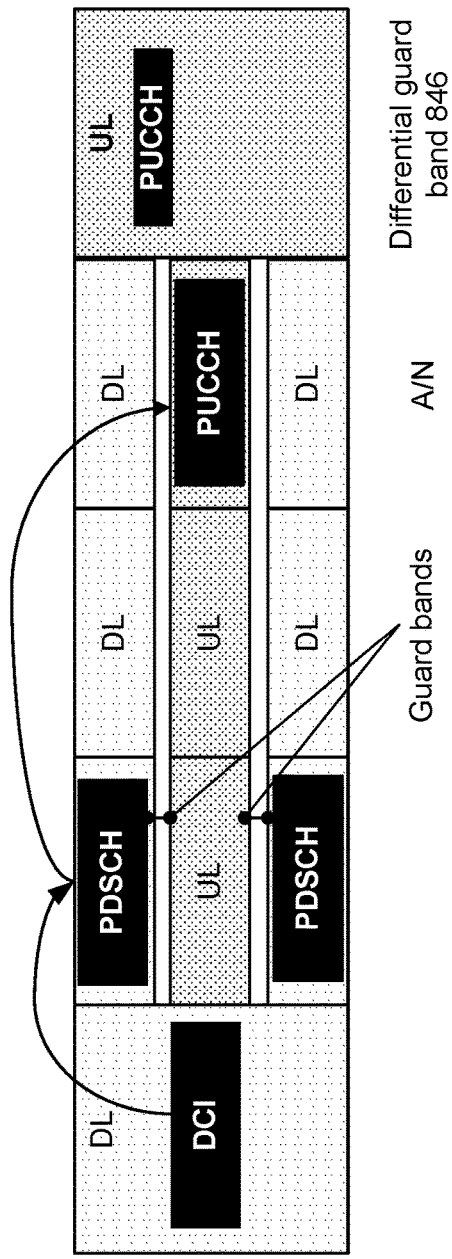
FIG. 10 is a diagram illustrating an example of bundling feedback and a differential guard band, in accordance with the present disclosure.

FIG. 10 is a diagram illustrating an example 1000 of bundling feedback and a differential guard band, in accordance with the present disclosure.

In some aspects, the UE 820 may indicate the A/N feedback and the differential guard band 846 in separate resources, whether the same slot or different slots. Example 1000 shows the A/N feedback and the differential guard band 846 in different slots. The grant (e.g., DCI) that indicates resources for the A/N feedback may also indicate resources for the differential guard band 846. This may include in which slot to transmit the indication of the differential guard band 846. The grant may also indicate which PUCCH resource to use for the indication of the differential guard band 846. The grant may indicate a power control parameter (e.g., transmit power) for the indication of the differential guard band 846.

As indicated above, FIG. 10 is provided as an example. Other examples may differ from what is described with regard to FIG. 10.

Figure 11:
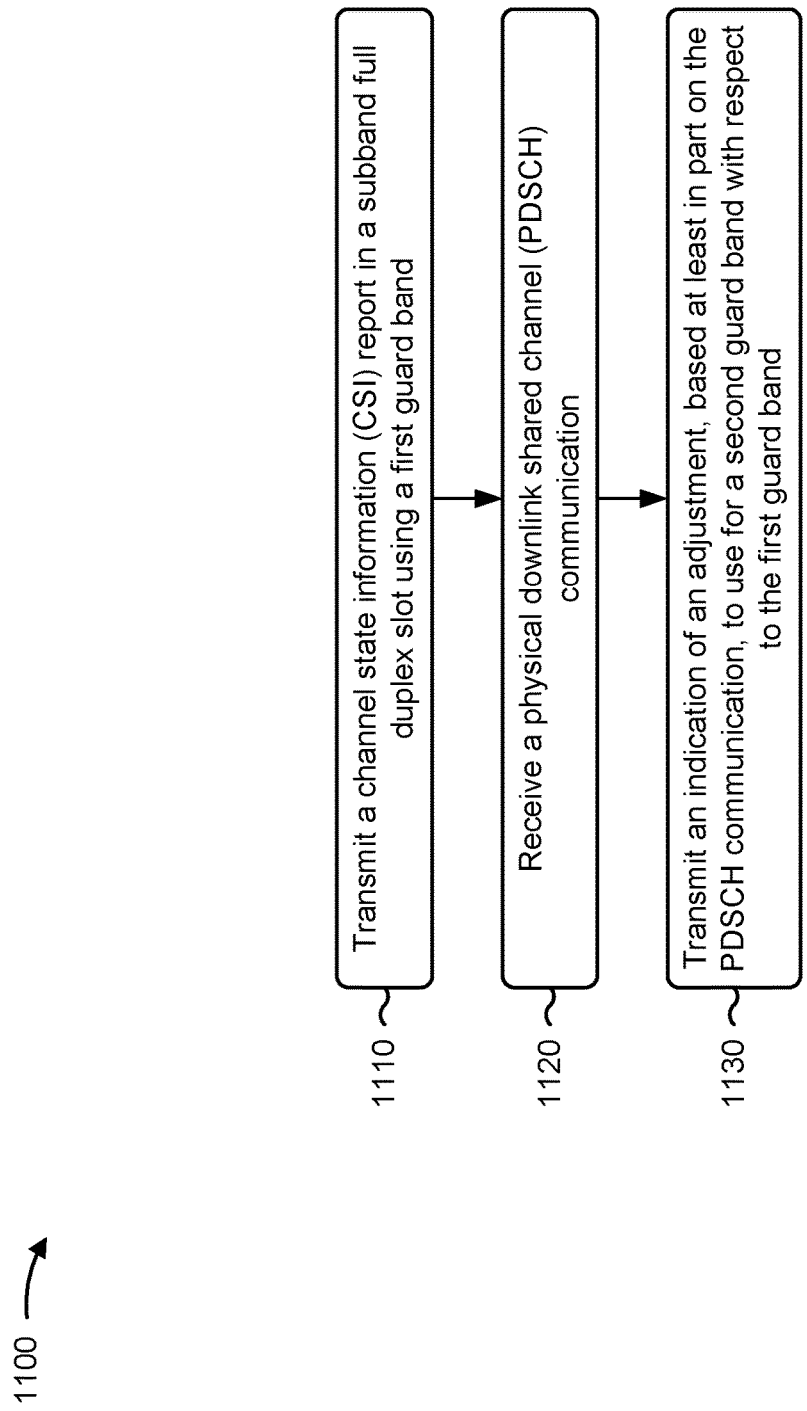
FIG. 11 is a diagram illustrating an example process performed, for example, by a UE, in accordance with the present disclosure.

FIG. 11 is a diagram illustrating an example process 1100 performed, for example, by a UE, in accordance with the present disclosure. Example process 1100 is an example where the UE (e.g., UE 120, UE 820) performs operations associated with a differential guard band for SBFD.

As shown in FIG. 11, in some aspects, process 1100 may include transmitting a CSI report in an SBFD slot using a first guard band (block 1110). For example, the UE (e.g., using communication manager 1308 and/or transmission component 1304 depicted in FIG. 13) may transmit a CSI report in an SBFD slot using a first guard band, as described above.

As further shown in FIG. 11, in some aspects, process 1100 may include receiving a PDSCH communication (block 1120). For example, the UE (e.g., using communication manager 1308 and/or reception component 1302 depicted in FIG. 13) may receive a PDSCH communication, as described above.

As further shown in FIG. 11, in some aspects, process 1100 may include transmitting an indication of an adjustment, based at least in part on the PDSCH communication, to use for a second guard band with respect to the first guard band (block 1130). For example, the UE (e.g., using communication manager 1308 and/or transmission component 1304 depicted in FIG. 13) may transmit an indication of an adjustment, based at least in part on the PDSCH communication, to use for a second guard band with respect to the first guard band, as described above.

Process 1100 may include additional aspects, such as any single aspect or any combination of aspects described below and/or in connection with one or more other processes described elsewhere herein.

In a first aspect, the adjustment is a differential resource amount with respect to a resource amount of the first guard band.

In a second aspect, alone or in combination with the first aspect, the adjustment is an increase in guard band resources.

In a third aspect, alone or in combination with one or more of the first and second aspects, the adjustment is a decrease in guard band resources.

In a fourth aspect, alone or in combination with one or more of the first through third aspects, the adjustment is based at least in part on a measurement of the PDSCH communication.

In a fifth aspect, alone or in combination with one or more of the first through fourth aspects, the measurement is an SNR or an SINR.

In a sixth aspect, alone or in combination with one or more of the first through fifth aspects, the SNR or SINR is based at least in part on a DMRS in the PDSCH communication.

In a seventh aspect, alone or in combination with one or more of the first through sixth aspects, the SNR or SINR is based at least in part on decoded data in the PDSCH communication.

In an eighth aspect, alone or in combination with one or more of the first through seventh aspects, the indication includes information about a measured SNR or SINR associated with the PDSCH communication.

In a ninth aspect, alone or in combination with one or more of the first through eighth aspects, the adjustment is based at least in part on a decoding success or failure of the PDSCH communication.

In a tenth aspect, alone or in combination with one or more of the first through ninth aspects, transmitting the indication includes bundling the indication with feedback for the PDSCH communication into a combined transmission.

In an eleventh aspect, alone or in combination with one or more of the first through tenth aspects, the combined transmission includes a first bit for the feedback and a second bit to indicate the adjustment.

In a twelfth aspect, alone or in combination with one or more of the first through eleventh aspects, the combined transmission includes multiple bits that are jointly encoded to indicate an ACK or NACK with an amount of the adjustment.

In a thirteenth aspect, alone or in combination with one or more of the first through twelfth aspects, the amount of the adjustment corresponds to a specified bit combination among multiple bit combinations.

In a fourteenth aspect, alone or in combination with one or more of the first through thirteenth aspects, process 1100 includes bundling a differential CSI into the combined transmission.

In a fifteenth aspect, alone or in combination with one or more of the first through fourteenth aspects, process 1100 includes receiving a configuration for multiple PUCCH resources for the feedback.

In a sixteenth aspect, alone or in combination with one or more of the first through fifteenth aspects, process 1100 includes transmitting feedback for the PDSCH communication in a transmission that is separate from a transmission that includes the indication.

In a seventeenth aspect, alone or in combination with one or more of the first through sixteenth aspects, process 1100 includes receiving, in a grant for the PDSCH communication, an indication of an SBFD slot to use with the second guard band.

In an eighteenth aspect, alone or in combination with one or more of the first through seventeenth aspects, process 1100 includes receiving, in a grant for the PDSCH communication, an indication of resources in an SBFD slot to use for the second guard band.

In a nineteenth aspect, alone or in combination with one or more of the first through eighteenth aspects, process 1100 includes receiving, in a grant for the PDSCH communication, an indication of a power parameter to use for the second guard band in an SBFD slot.

In a twentieth aspect, alone or in combination with one or more of the first through nineteenth aspects, the adjustment is associated with a first downlink subband, and the indication of the adjustment indicates another adjustment for a second downlink subband.

In a twenty-first aspect, alone or in combination with one or more of the first through twentieth aspects, process 1100 includes receiving a configuration for determining and transmitting the adjustment.

In a twenty-second aspect, alone or in combination with one or more of the first through twenty-first aspects, process 1100 includes transmitting information about symbols for which CLI is observed.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
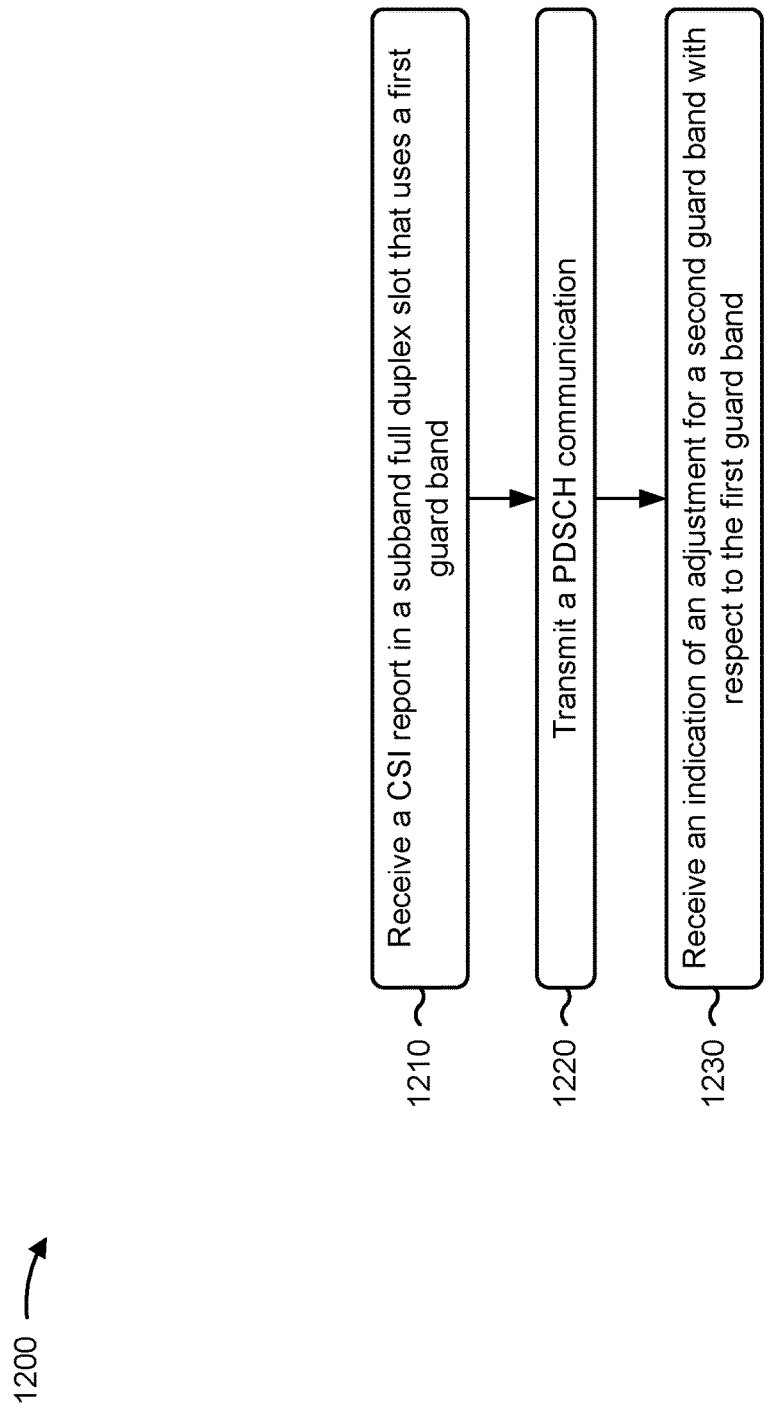
FIG. 12 is a diagram illustrating an example process performed, for example, by a network entity, in accordance with the present disclosure.

FIG. 12 is a diagram illustrating an example process 1200 performed, for example, by a network entity, in accordance with the present disclosure. Example process 1200 is an example where the network entity (e.g., base station 110, network entity 810) performs operations associated with a differential guard band for SBFD.

As shown in FIG. 12, in some aspects, process 1200 may include receiving a CSI report in an SBFD slot that uses a first guard band (block 1210). For example, the network entity (e.g., using communication manager 1408 and/or reception component 1402 depicted in FIG. 14) may receive a CSI report in a subband full duplex slot that uses a first guard band, as described above. In some aspects, the first guard band may be based at least in part on a UE capability of a minimum guard band for SBFD operation. In some aspects, the first guard band may be based at least in part on an earlier CSI report of a guard band.

As further shown in FIG. 12, in some aspects, process 1200 may include transmitting a PDSCH communication (block 1220). For example, the network entity (e.g., using communication manager 1408 and/or transmission component 1404 depicted in FIG. 14) may transmit a PDSCH communication, as described above.

As further shown in FIG. 12, in some aspects, process 1200 may include receiving an indication of an adjustment for a second guard band with respect to the first guard band (block 1230). For example, the network entity (e.g., using communication manager 1408 and/or reception component 1402 depicted in FIG. 14) may receive an indication of an adjustment for a second guard band with respect to the first guard band, as described above.

Process 1200 may include additional aspects, such as any single aspect or any combination of aspects described below and/or in connection with one or more other processes described elsewhere herein.

In a first aspect, process 1200 includes determining to use the second guard band, transmitting an instruction to use the second guard band, and receiving an uplink communication that uses the second guard band.

In a second aspect, alone or in combination with the first aspect, process 1200 includes transmitting a configuration for determining and transmitting guard band adjustments.

In a third aspect, alone or in combination with one or more of the first and second aspects, the adjustment is a differential resource amount with respect to a resource amount of the first guard band.

In a fourth aspect, alone or in combination with one or more of the first through third aspects, receiving the indication includes receiving the indication bundled into a combined transmission with feedback for the PDSCH communication.

In a fifth aspect, alone or in combination with one or more of the first through fourth aspects, process 1200 includes receiving differential CSI in the combined transmission.

In a sixth aspect, alone or in combination with one or more of the first through fifth aspects, process 1200 includes transmitting, in a grant for the PDSCH communication, an indication of one or more of an SBFD slot to use with the second guard band, resources in the subband full duplex slot to use for the second guard band, or a power parameter to use for the second guard band in the subband full duplex slot.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
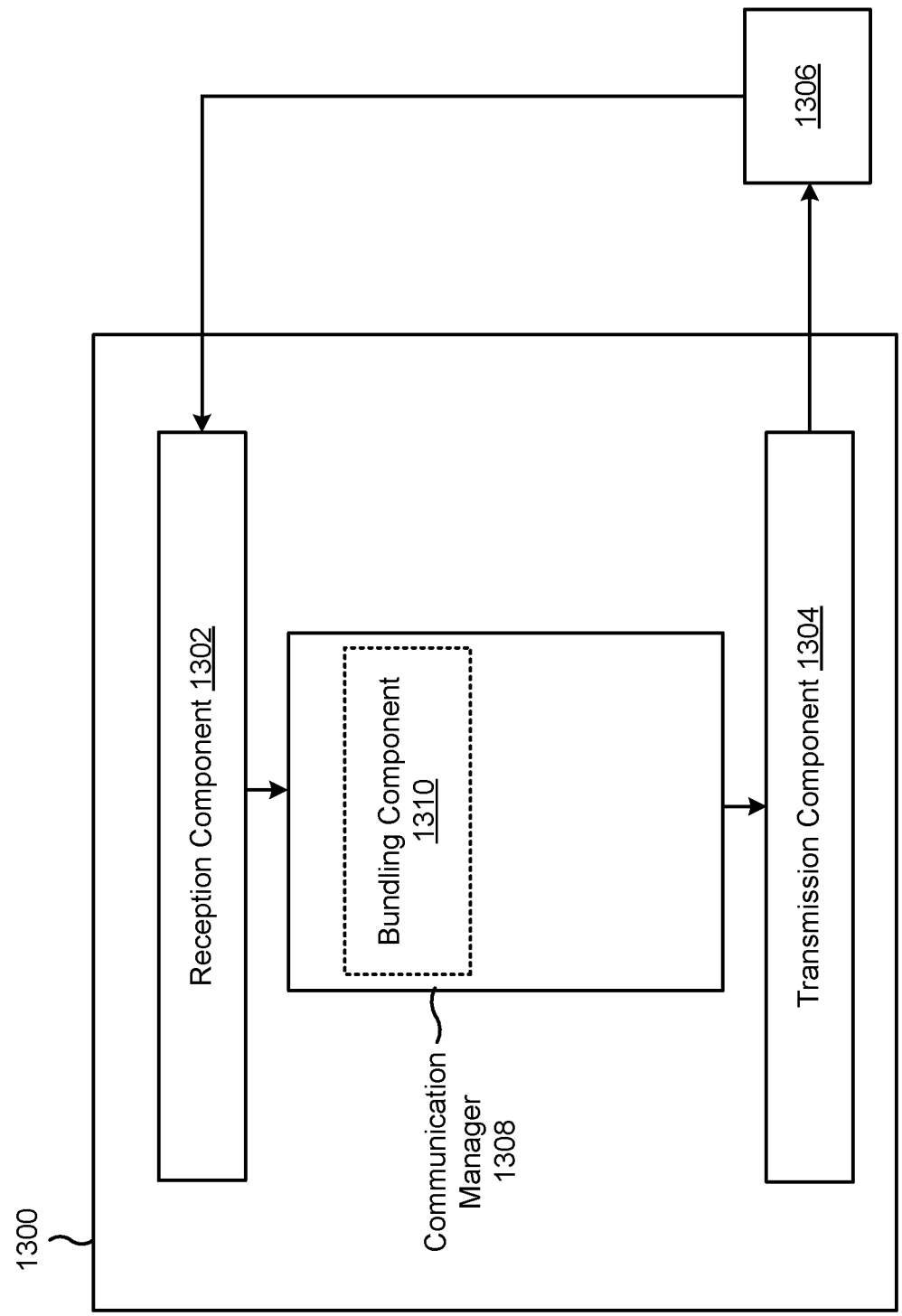
FIG. 13 is a diagram of an example apparatus for wireless communication, in accordance with the present disclosure.

FIG. 13 is a diagram of an example apparatus 1300 for wireless communication, in accordance with the present disclosure. The apparatus 1300 may be a UE (e.g., UE 120, UE 820), or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 1308. The communication manager 1308 may control and/or otherwise manage one or more operations of the reception component 1302 and/or the transmission component 1304. In some aspects, the communication manager 1308 may include one or more antennas, a modem, a controller/processor, a memory, or a combination thereof, of the UE described in connection with FIG. 2. The communication manager 1308 may be, or be similar to, the communication manager 140 depicted in FIGS. 1 and 2. For example, in some aspects, the communication manager 1308 may be configured to perform one or more of the functions described as being performed by the communication manager 140. In some aspects, the communication manager 1308 may include the reception component 1302 and/or the transmission component 1304. The communication manager 1308 may include a bundling component 1310, among other examples.

In some aspects, the apparatus 1300 may be configured to perform one or more operations described herein in connection with FIGS. 1-10. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the UE described in connection with FIG. 2.

Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the UE described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the UE described in connection with FIG. 2. In some aspects, the transmission component 1304 may be co-located with the reception component 1302 in a transceiver.

The transmission component 1304 may transmit a CSI report in an SBFD slot using a first guard band. The reception component 1302 may receive a PDSCH communication. The transmission component 1304 may transmit an indication of an adjustment, based at least in part on the PDSCH communication, to use for a second guard band with respect to the first guard band.

The bundling component 1310 may bundle a differential CSI into the combined transmission. The reception component 1302 may receive a configuration for multiple PUCCH resources for the feedback.

The transmission component 1304 may transmit feedback for the PDSCH communication in a transmission that is separate from a transmission that includes the indication.

The reception component 1302 may receive, in a grant for the PDSCH communication, an indication of an SBFD slot to use with the second guard band. The reception component 1302 may receive, in a grant for the PDSCH communication, an indication of resources in an SBFD slot to use for the second guard band. The reception component 1302 may receive, in a grant for the PDSCH communication, an indication of a power parameter to use for the second guard band in an SBFD slot.

The reception component 1302 may receive a configuration for determining and transmitting the adjustment. The transmission component 1304 may transmit information about symbols for which CLI is observed.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
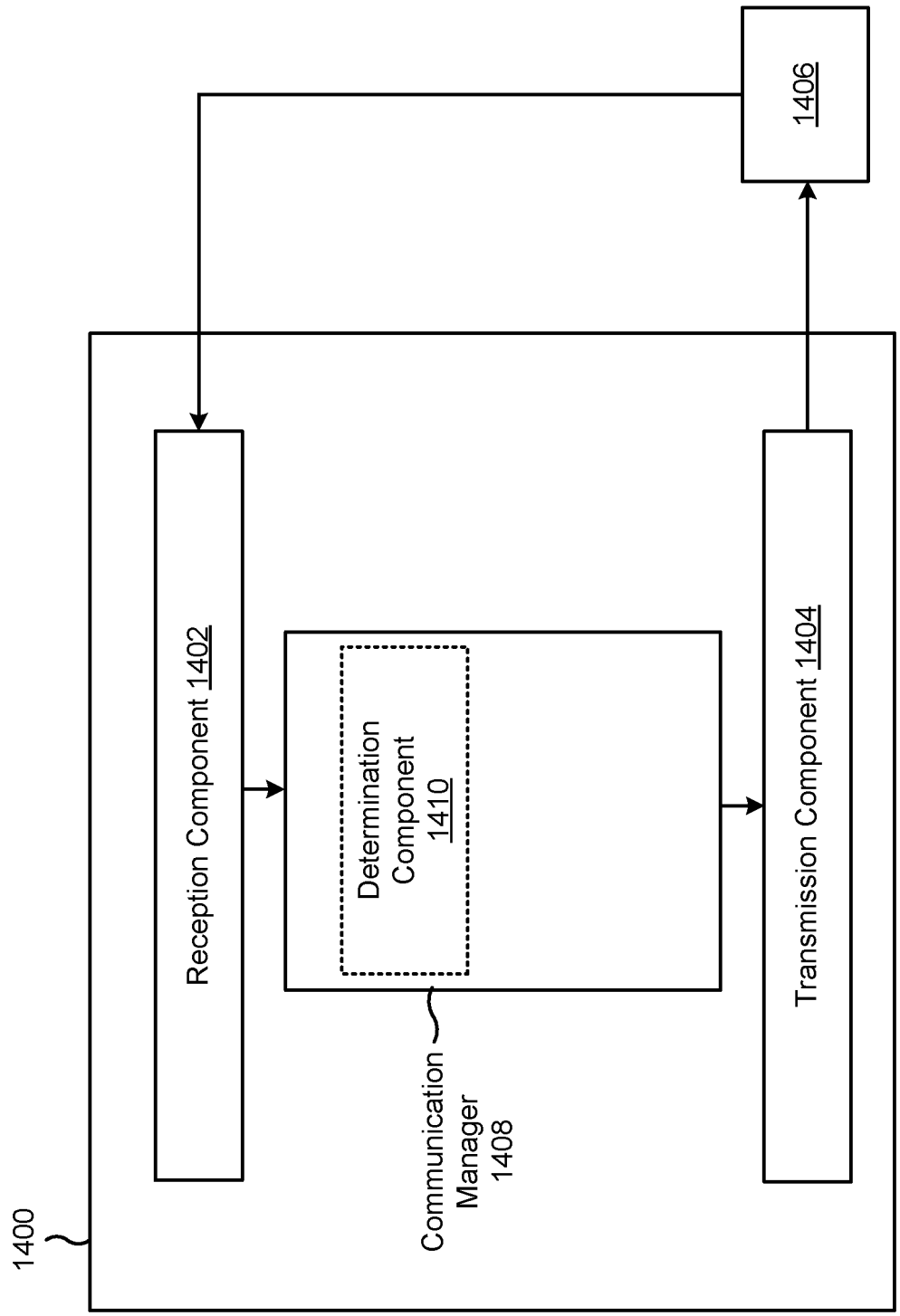
FIG. 14 is a diagram of an example apparatus for wireless communication, in accordance with the present disclosure.

FIG. 14 is a diagram of an example apparatus 1400 for wireless communication, in accordance with the present disclosure. The apparatus 1400 may be a network entity (e.g., base station 110, network entity 810), or a network entity may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 1408. The communication manager 1408 may control and/or otherwise manage one or more operations of the reception component 1402 and/or the transmission component 1404. In some aspects, the communication manager 1408 may include one or more antennas, a modem, a controller/processor, a memory, or a combination thereof, of the network entity described in connection with FIG. 2. The communication manager 1408 may be, or be similar to, the communication manager 150 depicted in FIGS. 1 and 2. For example, in some aspects, the communication manager 1408 may be configured to perform one or more of the functions described as being performed by the communication manager 150. In some aspects, the communication manager 1408 may include the reception component 1402 and/or the transmission component 1404. The communication manager 1408 may include a determination component 1410, among other examples.

In some aspects, the apparatus 1400 may be configured to perform one or more operations described herein in connection with FIGS. 1-10. Additionally, or alternatively, the apparatus 1400 may be configured to perform one or more processes described herein, such as process 1200 of FIG. 12. In some aspects, the apparatus 1400 and/or one or more components shown in FIG. 14 may include one or more components of the network entity described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the network entity described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the network entity described in connection with FIG. 2. In some aspects, the transmission component 1404 may be co-located with the reception component 1402 in a transceiver.

The reception component 1402 may receive a CSI report in an SBFD slot that uses a first guard band. The transmission component 1404 may transmit a PDSCH communication. The reception component 1402 may receive an indication of an adjustment for a second guard band with respect to the first guard band.

The determination component 1410 may determine to use the second guard band. The transmission component 1404 may transmit an instruction to use the second guard band. The reception component 1402 may receive an uplink communication that uses the second guard band.

The transmission component 1404 may transmit a configuration for determining and transmitting guard band adjustments. The reception component 1402 may receive differential CSI in the combined transmission.

The transmission component 1404 may transmit, in a grant for the PDSCH communication, an indication of one or more of an SBFD slot to use with the second guard band, resources in the SBFD slot to use for the second guard band, or a power parameter to use for the second guard band in the SBFD slot.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a user equipment (UE), comprising: transmitting a channel state information (CSI) report in a subband full duplex slot using a first guard band; receiving a physical downlink shared channel (PDSCH) communication; and transmitting an indication of an adjustment, based at least in part on the PDSCH communication, to use for a second guard band with respect to the first guard band.

Aspect 2: The method of Aspect 1, wherein the adjustment is a differential resource amount with respect to a resource amount of the first guard band.

Aspect 3: The method of Aspect 2, wherein the adjustment is an increase in guard band resources.

Aspect 4: The method of Aspect 2, wherein the adjustment is a decrease in guard band resources.

Aspect 5: The method of any of Aspects 1-4, wherein the adjustment is based at least in part on a measurement of the PDSCH communication.

Aspect 6: The method of Aspect 5, wherein the measurement is a signal-to-noise ratio (SNR) or signal-to-interference-plus-noise ratio (SINR).

Aspect 7: The method of Aspect 6, wherein the SNR or SINR is based at least in part on a demodulation reference signal in the PDSCH communication.

Aspect 8: The method of Aspect 6 or 7, wherein the SNR or SINR is based at least in part on decoded data in the PDSCH communication.

Aspect 9: The method of any of Aspects 1-8, wherein the indication includes information about a measured SNR or SINR associated with the PDSCH communication.

Aspect 10: The method of any of Aspects 1-9, wherein the adjustment is based at least in part on a decoding success or failure of the PDSCH communication.

Aspect 11: The method of any of Aspects 1-10, wherein transmitting the indication includes bundling the indication with feedback for the PDSCH communication into a combined transmission.

Aspect 12: The method of Aspect 11, wherein the combined transmission includes a first bit for the feedback and a second bit to indicate the adjustment.

Aspect 13: The method of Aspect 11, wherein the combined transmission includes multiple bits that are jointly encoded to indicate an acknowledgment or a negative acknowledgement with an amount of the adjustment.

Aspect 14: The method of Aspect 13, wherein the amount of the adjustment corresponds to a specified bit combination among multiple bit combinations.

Aspect 15: The method of any of Aspects 11-14, further comprising bundling a differential CSI into the combined transmission.

Aspect 16: The method of any of Aspects 11-15, further comprising receiving a configuration for multiple physical uplink control channel resources for the feedback.

Aspect 17: The method of any of Aspects 1-10 and 15-16, further comprising transmitting feedback for the PDSCH communication in a transmission that is separate from a transmission that includes the indication.

Aspect 18: The method of any of Aspects 1-17, further comprising receiving, in a grant for the PDSCH communication, an indication of a subband full duplex slot to use with the second guard band.

Aspect 19: The method of any of Aspects 1-18, further comprising receiving, in a grant for the PDSCH communication, an indication of resources in a subband full duplex slot to use for the second guard band.

Aspect 20: The method of any of Aspects 1-19, further comprising receiving, in a grant for the PDSCH communication, an indication of a power parameter to use for the second guard band in a subband full duplex slot.

Aspect 21: The method of any of Aspects 1-20, wherein the adjustment is associated with a first downlink subband, and wherein the indication of the adjustment indicates another adjustment for a second downlink subband.

Aspect 22: The method of any of Aspects 1-21, further comprising receiving a configuration for determining and transmitting the adjustment.

Aspect 23: The method of any of Aspects 1-22, further comprising transmitting information about symbols for which cross-link interference is observed.

Aspect 24: A method of wireless communication performed by a network entity, comprising: receiving a channel state information (CSI) report in a subband full duplex slot that uses a first guard band; transmitting a physical downlink shared channel (PDSCH) communication; and receiving an indication of an adjustment for a second guard band with respect to the first guard band.

Aspect 25: The method of Aspect 24, further comprising: determining to use the second guard band; transmitting an instruction to use the second guard band; and receiving an uplink communication that uses the second guard band.

Aspect 26: The method of Aspect 24 or 25, further comprising transmitting a configuration for determining and transmitting guard band adjustments.

Aspect 27: The method of any of Aspects 24-26, wherein the adjustment is a differential resource amount with respect to a resource amount of the first guard band.

Aspect 28: The method of any of Aspects 24-27, wherein receiving the indication includes receiving the indication bundled into a combined transmission with feedback for the PDSCH communication.

Aspect 29: The method of Aspect 28, further comprising receiving differential CSI in the combined transmission.

Aspect 30: The method of any of Aspects 24-29, further comprising transmitting, in a grant for the PDSCH communication, an indication of one or more of a subband full duplex slot to use with the second guard band, resources in the subband full duplex slot to use for the second guard band, or a power parameter to use for the second guard band in the subband full duplex slot.

Aspect 31: An apparatus for wireless communication at a device, comprising a processor; memory coupled with the processor; and instructions stored in the memory and executable by the processor to cause the apparatus to perform the method of one or more of Aspects 1-30.

Aspect 32: A device for wireless communication, comprising a memory and one or more processors coupled to the memory, the one or more processors configured to perform the method of one or more of Aspects 1-30.

Aspect 33: An apparatus for wireless communication, comprising at least one means for performing the method of one or more of Aspects 1-30.

Aspect 34: A non-transitory computer-readable medium storing code for wireless communication, the code comprising instructions executable by a processor to perform the method of one or more of Aspects 1-30.

Aspect 35: A non-transitory computer-readable medium storing a set of instructions for wireless communication, the set of instructions comprising one or more instructions that, when executed by one or more processors of a device, cause the device to perform the method of one or more of Aspects 1-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors, coupled to the memory, configured to:
transmit a channel state information (CSI) report in a subband full duplex slot using a first guard band;
receive a physical downlink shared channel (PDSCH) communication; and
transmit an indication of an adjustment, based at least in part on the PDSCH communication, to use for a second guard band with respect to the first guard band.

2. The UE of claim 1, wherein the adjustment is a differential resource amount with respect to a resource amount of the first guard band.

3. The UE of claim 1, wherein the adjustment is an increase in guard band resources.

4. The UE of claim 1, wherein the adjustment is a decrease in guard band resources.

5. The UE of claim 1, wherein the adjustment is based at least in part on a measurement of the PDSCH communication.

6. The UE of claim 5, wherein the measurement is a signal-to-noise ratio (SNR) or signal-to-interference-plus-noise ratio (SINR).

7. The UE of claim 6, wherein the SNR or SINR is based at least in part on a demodulation reference signal in the PDSCH communication.

8. The UE of claim 6, wherein the SNR or SINR is based at least in part on decoded data in the PDSCH communication.

9. The UE of claim 1, wherein the indication includes information about a measured SNR or SINR associated with the PDSCH communication.

10. The UE of claim 1, wherein the adjustment is based at least in part on a decoding success or failure of the PDSCH communication.

11. The UE of claim 1, wherein the one or more processors, to transmit the indication, are configured to bundle the indication with feedback for the PDSCH communication into a combined transmission.

12. The UE of claim 11, wherein the combined transmission includes a first bit for the feedback and a second bit to indicate the adjustment.

13. The UE of claim 11, wherein the combined transmission includes multiple bits that are jointly encoded to indicate an acknowledgment or a negative acknowledgement with an amount of the adjustment.

14. The UE of claim 13, wherein the amount of the adjustment corresponds to a specified bit combination among multiple bit combinations.

15. The UE of claim 11, wherein the one or more processors are configured to bundle a differential CSI into the combined transmission.

16. The UE of claim 11, wherein the one or more processors are configured to receive a configuration for multiple physical uplink control channel resources for the feedback.

17. The UE of claim 1, wherein the one or more processors are configured to transmit feedback for the PDSCH communication in a transmission that is separate from a transmission that includes the indication.

18. The UE of claim 1, wherein the one or more processors are configured to receive, in a grant for the PDSCH communication, an indication of a subband full duplex slot to use with the second guard band.

19. The UE of claim 1, wherein the one or more processors are configured to receive, in a grant for the PDSCH communication, an indication of resources in a subband full duplex slot to use for the second guard band.

20. The UE of claim 1, wherein the one or more processors are configured to receive, in a grant for the PDSCH communication, an indication of a power parameter to use for the second guard band in a subband full duplex slot.

21. The UE of claim 1, wherein the adjustment is associated with a first downlink subband, and wherein the indication of the adjustment indicates another adjustment for a second downlink subband.

22. The UE of claim 1, wherein the one or more processors are configured to receive a configuration for determining and transmitting the adjustment.

23. The UE of claim 1, wherein the one or more processors are configured to transmit information about symbols for which cross-link interference is observed.

24. A network entity for wireless communication, comprising:
a memory; and
one or more processors, coupled to the memory, configured to:
receive a channel state information (CSI) report in a subband full duplex slot that uses a first guard band;
transmit a physical downlink shared channel (PDSCH) communication; and
receive an indication of an adjustment for a second guard band with respect to the first guard band.

25. The network entity of claim 24, wherein the one or more processors are configured to:
determine to use the second guard band;
transmit an instruction to use the second guard band; and
receive an uplink communication that uses the second guard band.

26. The network entity of claim 24, wherein the one or more processors are configured to transmit a configuration for determining and transmitting guard band adjustments.

27. The network entity of claim 24, wherein the adjustment is a differential resource amount with respect to a resource amount of the first guard band.

28. The network entity of claim 24, wherein the one or more processors, to receive the indication, are configured to receive the indication bundled into a combined transmission with feedback for the PDSCH communication.

29. The network entity of claim 28, wherein the one or more processors are configured to receive differential CSI in the combined transmission.

30. The network entity of claim 24, wherein the one or more processors are configured to transmit, in a grant for the PDSCH communication, an indication of one or more of a subband full duplex slot to use with the second guard band, resources in the subband full duplex slot to use for the second guard band, or a power parameter to use for the second guard band in the subband full duplex slot.

* * * * *